United States Patent [19]

Gosney, Jr.

[11] 3,889,245

[45] June 10, 1975

[54] METAL-INSULATOR-SEMICONDUCTOR COMPATIBLE CHARGE TRANSFER DEVICE MEMORY SYSTEM

[75] Inventor: William Milton Gosney, Jr., Richardson, Tex.

[73] Assignee: Texas Instruments Incorporated, Dallas, Tex.

[22] Filed: July 2, 1973

[21] Appl. No.: 375,554

[52] U.S. Cl. .. 340/173 RC; 307/221 C; 340/173 R; 357/24

[51] Int. Cl. .. G11c 19/00; H01l 11/14; G11c 21/00

[58] Field of Search .................. 340/173 R, 173 RC; 307/221 R, 221 C; 357/24

[56] References Cited

UNITED STATES PATENTS

| | | | |
|---|---|---|---|
| 3,609,392 | 9/1971 | Tetik | 307/221 |
| 3,760,202 | 9/1973 | Kosonacky | 307/304 |

*Primary Examiner*—Stuart N. Hecker

*Attorney, Agent, or Firm*—Harold Levine; James T. Comfort; Gary C. Honeycutt

[57] ABSTRACT

A semiconductor charge transfer device memory system is provided which is compatible with metal-insulator-semiconductor circuitry and which can be organized into a variety of configurations, on a chip, by selectively interconnecting basic building-block shift register circuits. In a preferred embodiment, three adjacent charge-coupled device shift registers are multiplexed in order to produce a system having a data rate compatible with dynamic metal-insulator semiconductor circuitry. A detector is formed on the chip at the output of each set of multiplexed shift registers, and provides an output voltage corresponding to the logic level of detected charge for each bit of data. The memory system includes on a single chip, a plurality of sets of multiplexed charge-transfer device shift registers, each set having associated therewith a detector and input circuitry, the detector and input circuitry comprising conventional metal-insulator semiconductor devices. In the present memory system, the clock generator for producing the clocks for controlling the shift registers, the detector, input circuitry, and control and decode circuitry can all be formed on a single chip while advantageously maintaining extremely high packing density.

18 Claims, 11 Drawing Figures

METAL-INSULATOR-SEMICONDUCTOR COMPATIBLE CHARGE TRANSFER DEVICE MEMORY SYSTEM

The present invention pertains generally to semiconductor charge transfer device system and more particularly to a charge transfer device memory system which is compatible with metal insulator semiconductor circuitry.

Semiconductor charge transfer devices (CTD) have received considerable attention in the Electronics Industry due to the extremely high packing density that can theoretically be achieved with these device configurations. The semiconductor charge transfer devices, which are essentially metal insulator semiconductor (MIS) device configurations, include two primary configurations: charge-coupled devices (CCD) and bucket brigade configurations of insulated gate field-effect transistors (BB). Since the charge transfer devices operate on the principle of transferring semiconductor charge, each bit can be fabricated to be extremely small, enabling extremely high packing densities. For example, a typical bit of conventional insulatedgate field-effect transistor (IGFET) memory cell may be on the order of four square mils whereas a bit of CCD memory cell may require less than one square mil of semiconductor material. The basic configurations of both CCDs and bucket brigades are described extensively in the literature, and various proposals have been suggested for fabricating memory arrays utilizing charge transfer devices.

To date, however, a variety of problems have precluded commercial realization of the small bit size which is theoretically possible with the charge transfer device configurations. One of the major problems stems from the fact that the small bit size is realized at a sacrifice of gain. The signal which must be detected is a voltage change produced by a very small change in the amount of charge stored at a storage location. Detecting this small amount of charge has proven to be extremely difficult. Proposed techniques for detecting the charge utilize a detector configuration which is located external to the chip upon which the charge transfer device memory array is formed. The detection circuitry is rather complex and further, since it is external to the chip, it is extremely sensitive to noise and voltage variations, often making detection of the signal impossible. To date it has not proven feasible to form such detector circuitry on the same chip as the CCD since the detector currently used is rather large and placing it upon the same chip as the charge transfer device memory results in an effective decrease in packing density, thereby eliminating the major advantage of using CTD memory devices in the first instance.

One charge transfer device memory array that has proven successful is characterized as a serial-parallel-serial (SPS) configuration. This charge transfer device configuration is described in more detail in copending U.S. application Ser. No. 207,905 filed Dec. 14, 1971 in the name of Dean Collins and is assigned to the Assignee of the present invention. This SPS configuration achieves high packing density but also requires external detector circuitry. Another limitation of this configuration is that only one memory organization is possible, that is, 1×N bits. Many applications, however, require different memory configurations and it would be desirable to have a basic memory unit which could be organized into different memory organizations as required. For example, a 4,000 bit memory could be organized into a 1 × 4,000 bit configuration; a 2 × 2,000; a 4 × 1,000, etc.

A further difficulty encountered in providing charge transfer device memories with a high packing density is also evidenced in the SPS organization previously referenced. This problem pertains to the clocking scheme required for transfer of data. By way of illustration, CCD's require overlapping clock pulses, while metal insulator semiconductor devices such as IGFETs require two phase non-overlapping clock systems. Thus there is an incompatability between the clock systems of the two technologies. Further in the SPS organization, for a three phase CCD memory, seven different clocks are required. Circuitry for generating this rather complex clocking system requires a rather large amount of real estate on the chip, or else requires circuitry external to the chip for generation of the clock pulses.

The incompatability of the clocking systems of metal insulator semiconductor devices and the charge transfer devices has resulted in a charge transfer device data rate which is substantially less than that of an associated MIS System. This results because typically one of the nonoverlapping clock trains of the MIS System is used to generate the overlapping multiphase clock system required for the charge transfer device memory configuration. In a three phase CTD configuration, each of the three phases of the charge transfer device thus has a frequency of one-third that of the clock rate of the MIS System. It would be advantageous to have a charge transfer device memory system for use in conjunction with MIS control circuitry wherein the data rate of the charge transfer device portion was the same as the clock rate used to control the MIS circuitry.

Accordingly, it is an object of the present invention to provide a charge transfer device memory organization compatible with MIS control circuitry.

Yet another object of the present invention is a charge transfer device memory configuration that includes a plurality of parallel charge transfer device shift registers wherein input data is multiplexed on at least a set of two adjacent shift registers so as to produce an effective data rate which corresponds to the clock rate of corresponding metal insulator semiconductor control circuitry.

A further object of the present invention is the provision of a charge transfer device memory configuration including a plurality of a parallel shift registers which can be selectively interconnected to provide desired memory organizations.

Yet another object of the present invention is a charge transfer device memory configuration including a plurality of charge transfer device shift registers on a semiconductor chip wherein the parallel shift registers are grouped in a plurality of sets for multiplexing input data, each multiplexed group of shift registers having an input circuit comprising IGFETs, and having a detector at the output for sequentially detecting the charge at the output bit of each of the multiplexed shift registers and for converting the detected charge into an output voltage corresponding to a logic 1 or a logic 0.

Still another object of the present invention is a charge transfer device memory configuration wherein detectors are provided on the same chip as the charge transfer devices themselves, thereby substantially eliminating noise and voltage variation errors associated with off-chip detector configurations.

Still another object of the invention is the provision of a charge transfer device memory configuration wherein a clock generator is formed on the chip to produce, responsive to a master MIS clock, a two phase non-overlapping clock for controlling MIS devices and for generating a multiphase overlapping clock system for controlling CTDs, and wherein address decode circuitry, shift register control circuitry, and detectors are also formed on the same semiconductor chip, while maintaining a packing density on the order of one bit per square mil or less.

Briefly in accordance with one aspect of the invention an improved charge transfer device memory system is provided which is compatible with MIS control circuitry. The memory system includes, on the memory chip, a clock generator which, in a preferred embodiment, receives the master clock of the system in which the memory is utilized. From this master system clock the clock generator generates both the two phase non-overlapping clock required for controlling MIS devices and also generates the multiphase overlapping clock system required for controlling the charge transfer devices. If the two phase non-overlapping clock is present in the system, it may be advantageous to generate only the multiphase overlapping clock system on the chip. The charge transfer device memory system can include both BB and CCD memory configurations. For clarity of illustration, a three phase charge coupled device configuration will be described.

A number of parallel CCD shift registers are formed on the chip. For the three phase CCD embodiment, the shift registers are grouped in sets of three each. Adjacent sets of shift registers are separated on the chip by a space sufficient to enable a doped interconnect to run therebetween. The interconnect enables recirculation of data through a set of shift registers or enables connection of the output of one set of shift registers to the input of the adjacent set of shift registers, thereby enabling organization of the memory into a desired configuration.

Each set of shift registers is coupled to IGFET input circuitry which is connected for receiving input data. The input circuitry is clocked from the two phase non-overlapping clock system and is effective to multiplex input data onto the three parallel shift registers associated therewith. An output detector is coupled to receive the output of each shift register in the set. The detector is effective to precharge the output diode associated with each shift register in order to enable detection of the charge stored by the last bit of each shift register. The detector is effective to detect this charge and to generate, on the chip, an output voltage corresponding to the digital logic level associated with the signal. The output of the detector is connected to a doped interconnect which runs parallel between the set of shift registers and the adjacent set of multiplexed shift registers. The interconnect can be either connected back to the input of the set of shift registers for recirculation of data, or can be connected to the input of the adjacent set of registers to provide a shift register having a longer bit capacity.

Further objects and advantages of the present invention will be apparent upon reading the following detailed description of illustrative embodiments in conjunction with the drawings wherein.

Figures 1, 4:
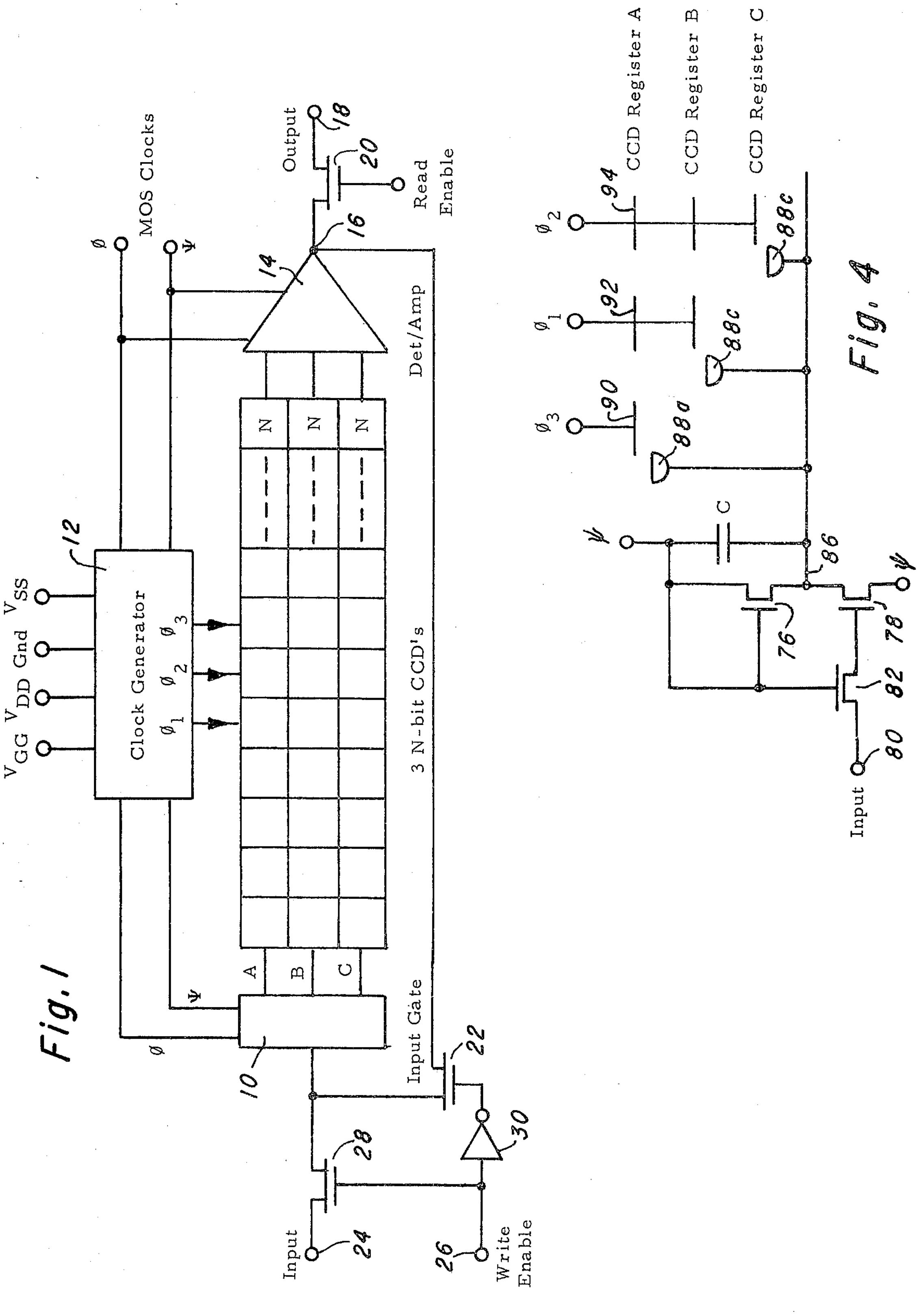
FIG. 1 is a block diagram illustrating a multiplexed three phase CCD having a detector on the chip for producing an output voltage for each bit corresponding to the digital logic level thereof.
FIG. 4 is a schematic and diagrammatic illustration of insulated gate field-effect transistor input circuitry suitable for multiplexing three parallel CCD shift registers.

With reference now to FIG. 1, there is illustrated a charge coupled device shift register which is compatible with existing dynamic metal insulator semiconductor circuitry. The shift register configuration shown in FIG. 1 defines a basic building block that can be used to expand the bit capacity of the memory, as will be explained in detail below. For clarity of illustration, three phase CCD systems will be described. It is understood, of course, that other polyphase CCD systems and BB CTD systems can be utilized.

For a three phase charge coupled device system the basic building block includes the three parallel shift registers shown generally at A, B and C. These three parallel shift registers are multiplexed by input circuitry 10. This input circuitry will be described in more detail with respect to the description of FIG. 4, but basically comprises insulated gate field-effect transistor circuitry. The shift registers A, B and C are operably responsive to multiphase overlapping clocks $\Phi_1$, $\Phi_2$, and $\Phi_3$. These multiphase clocks are generated by clock generator 12. Other clocks on the chip include two non-overlapping clocks Φ and ψ. These non-overlapping clocks are those conventionally used to operate dynamic metal insulator semiconductor circuitry, and typically are already present in a system with which the memory of the present invention is to be utilized. If they are not available, they can be generated on this chip from the system synchronization clock by a D-type flip-flop, as explained below with respect to FIG. 11. Typically, the clock generator 12 generates the clocks $\Phi_1$, $\Phi_2$, and $\Phi_3$ from one of the two non-overlapping clocks, such as Φ.

The shift registers A, B and C are shown in block diagram as having N bits each; suitable techniques for fabricating such multiphase CCD shift registers are well known in the art and need not be described in detail herein. A detector/amplifier 14 is coupled to receive the outputs of each of the shift registers A, B and D. The detector 14 demultiplexes the data transferred by the shift registers and provides an output voltage at node 16 which corresponds to either a logic 1 or a logic 0. This output voltage can be gated to an output terminal 18 by a gating transistor 20 if it is desired to have access to the output external to the chip. The gating transistor 20 is descriptively labeled "Read Enable" in FIG. 1. The output of the detector 14 is connected back to the input circuitry 10 through an input gate 22. In normal operation this enables the data in the three shift registers A, B and C to recirculate. Whenever it is desired to write new information into the shift registers, input data is applied at the input terminal 24 and the Write Enable terminal 26 is activated. The signal at terminal 26 enables the input data to be transferred by gating on transistor 28. The Write Enable signal at the terminal 26 is inverted at 30 thereby blocking transistor 22 from conduction, preventing data from being recirculated back to the input circuit 10.

By multiplexing the three shift registers A, B and C, the data rate present at the output node 16 is the same as the data rate of MIS circuitry which is operated by the two phase non-overlapping clocks Φ and ψ. This can more readily be seen when it is realized that one of the two phase non-overlapping clock pulses Φ is used to generate the three phase overlapping clock pulses $\Phi_1$, $\Phi_2$, and $\Phi_3$; thus the frequency of $\Phi_1$, $\Phi_2$, and $\Phi_3$ is respectively one-third that of the clock Φ. By multiplexing three of the shift registers, the effective data rate is thus maintained equal to that of Φ.

The input circuitry 10; the multiplexed shift registers A, B and C; and the detector amplifier 14 define a basic building block which can be used in a high-density CCD memory organization. In other words, repeating units of these building blocks can be used to expand the memory capability. This can more clearly be seen with reference to FIG. 2.

Figure 2:
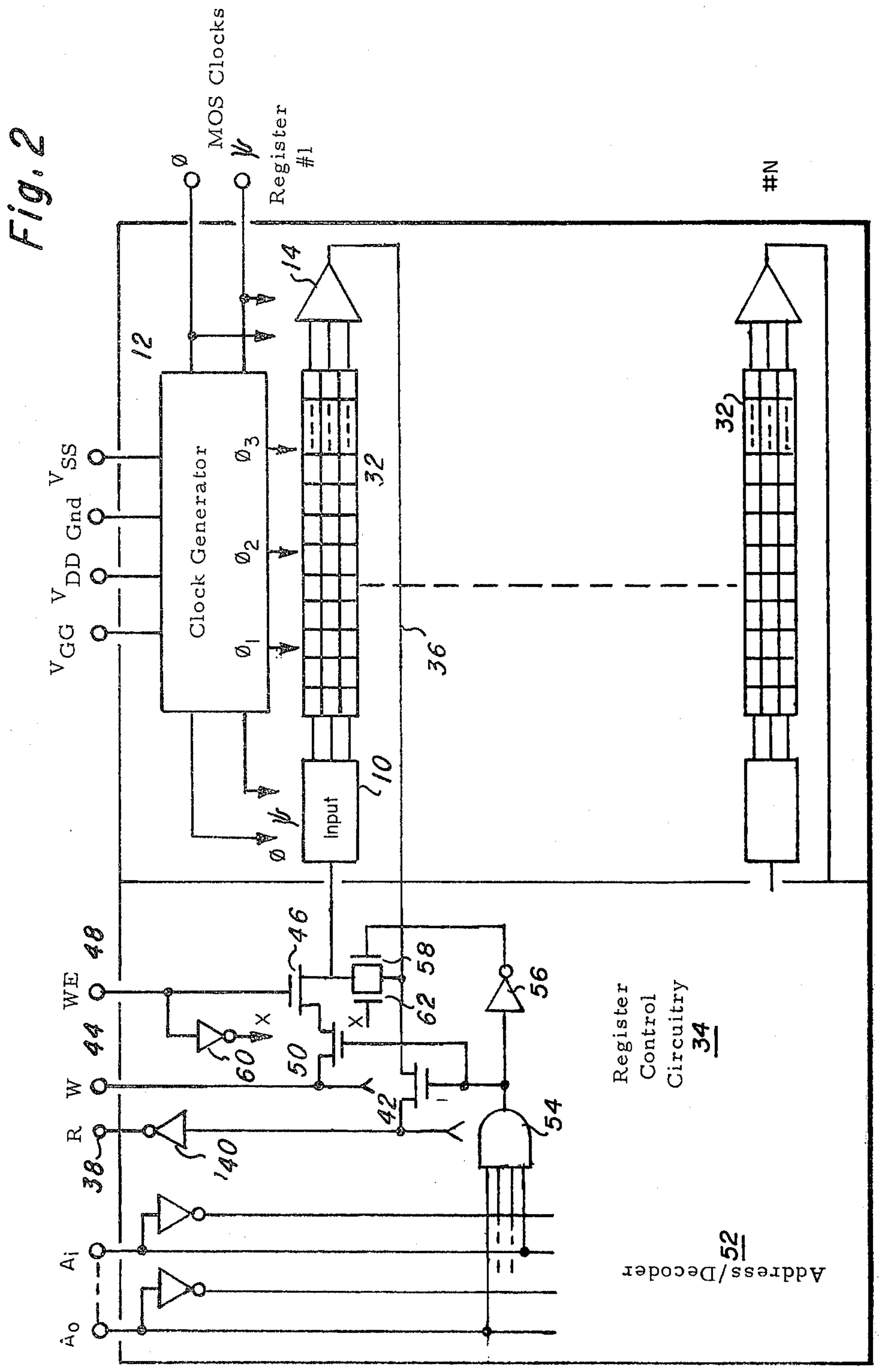
FIG. 2 is a block diagram of a CCD memory organization enabling high bit density wherein the clock generator, detectors, address decoder, and shift register control circuitry are all formed on a single chip.

In FIG. 2 organization of a charge coupled device memory on a chip is illustrated wherein sets of three multiplexed parallel CCD shift registers are shown generally at 32. Each set of three shift registers has an input circuit 10 and an output detector/amplifier 14. The output of the amplifier 14 is ohmically connected back to register control circuitry, shown generally at 34, by interconnect line 36. Preferably the interconnect line 36 is a doped interconnect which is formed in the region between two adjacent sets of shift registers 32. The width of the interconnect line 36 is on the same order as the width of one CCD shift register. The register control cicuitry 34 enables connecting the output of a CCD register unit 32 to be connected back to its input 10 for recirculation of data. Alternatively, the output can be connected to the input of an adjacent set of CCD shift registers 32 in the memory, or the output can be connected to terminal 38 to enable access to the data external to the chip. In the latter event, the data is transferred through transistor 42 and amplifier 40. Circuitry is also provided for writing new data into the shift registers. The data is inputted at the write terminal 44 through a gating transistor 46 which is operably responsive to a Write Enable logic signal applied to terminal 48. The desired set of shift registers 32 in which it is desired to write the data is selected by biasing on gating transistor 50 responsive to address decode logic shown generally at 52. The address signals $A_0$ through $A_i$ select a desired set of shift registers by enabling AND gate 54 which in turn enables the Read transfer gate 42 and the Write transfer gate 50. Inverter 56 biases off transistor 58 while the inverter 60 connected to the Write Enable terminal 48 insures that transistor 62 is biased off thereby preventing recirculation of the data from the output detector 14 back to the input circuitry 10. Suitable address decode logic 52 is well known in the art and need not be described in detail herein.

The clock generator 12 is also formed on the chip and is effective, as previously explained, to generate the two phase signal required for operation of the insulated field-effect transistor dynamic circuitry and also for generating the multiphase overlapping clock pulses necessary to operate the charge coupled device shift registers.

The memory organization shown in FIG. 2 enables the address decode logic 52, the register control circuitry 34, the clock generator 12, and the various CCD shift register units 32 to all be formed on the same chip while still maintaining a high packing density. By way of illustration, a chip approximately 200 × 200 mils has a capacity of 12K to 16K bits. Further, the only external connections to the chip are the address lines $A_0$ through $A_i$, the Read terminal 38, the Write terminal 44, the Write Enable terminal 48, and four voltages: $V_{GG}$, which is typically on the order of 10 to 12 volts; $V_{DD}$, which is typically on the order of 5 volts; ground; and $V_{SS}$, which is typically −1 or −2 volts.

Figure 3:
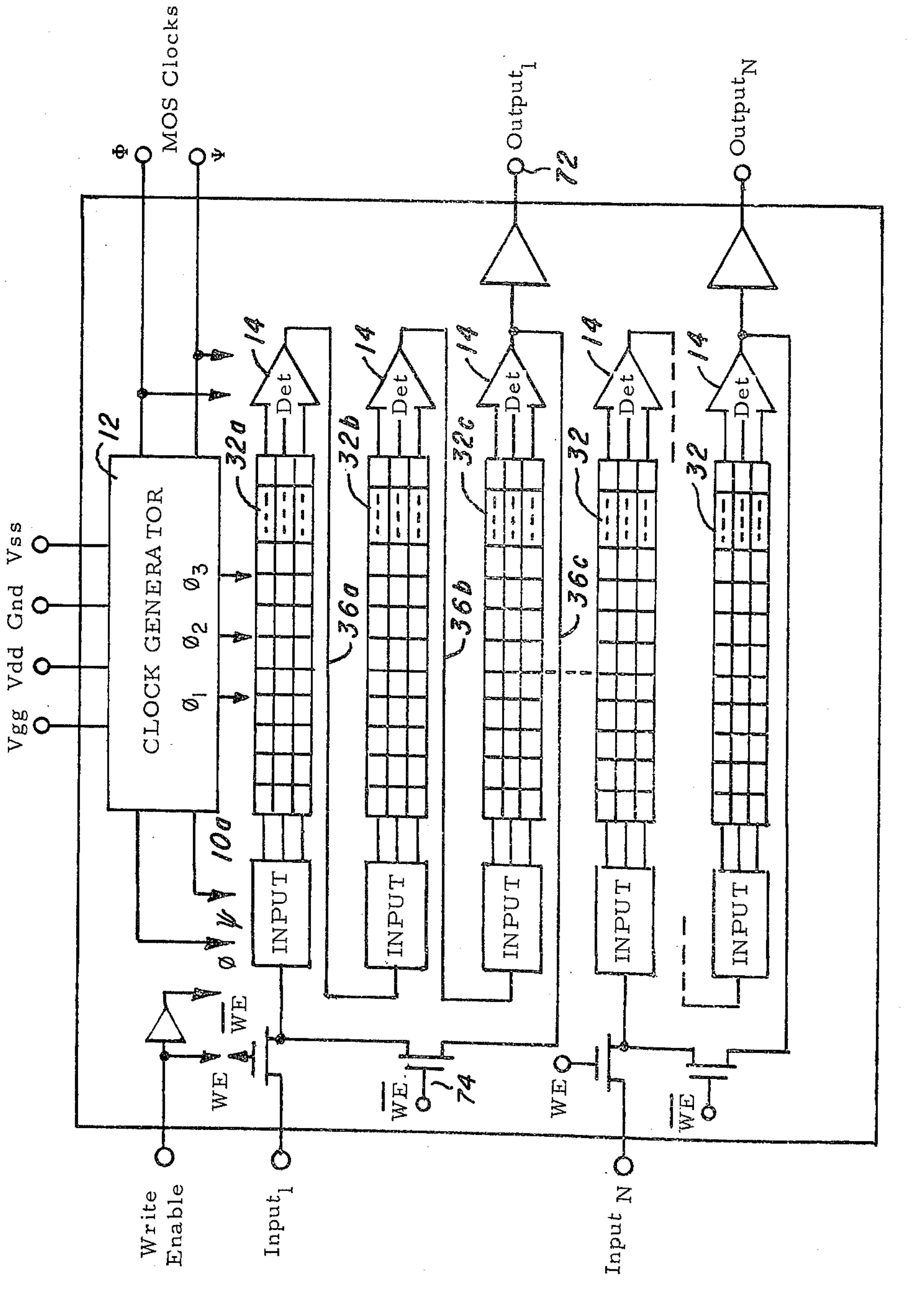
FIG. 3 is a block diagram illustration of a CCD configuration illustrating how various memory configurations can be achieved by selectively interconnecting adjacent sets of multiplexed CCD shift registers.

With reference now to FIG. 3, a portion of a chip is illustrated showing how the various multiplexed CCD shift register units 32 (reference FIG. 2) can be selectably interconnected to achieve desired memory organizations. For example, in FIG. 3 various sets of multiplexed CCD shift registers are shown generally at 32. Each shift register is N bits in length. The output of the first set of multiplexed shift registers 32*a* is connected to the input of the second set of multiplexed shift registers 32*b* by a doped interconnect 36*a*. Similarly, the output of the second set of multiplexed shift registers 32*b* is connected to the input of the third set of multiplexed shift registers 32*c* by the interconnect 36*b*. The output of the multiplexed shift registers 32*c* can be detected at the output terminal 72. It can be seen that this organization of shift register units provides a memory organization in blocks of 1 × 3N. The remaining sets of multiplexed shift register units 32 can similarly be selectively interconnected to provide other memory configurations as desired. If it is desired to recirculate the data instead of taking the output at 72, the interconnect $36c$ is gated back to the input $10a$ by a gating transistor 74. The gating transistor 74 can be controlled by the complement of the Write Enable input signal such that data is recirculated at all times except when it is desired to write new data into the shift register.

Figure 5:
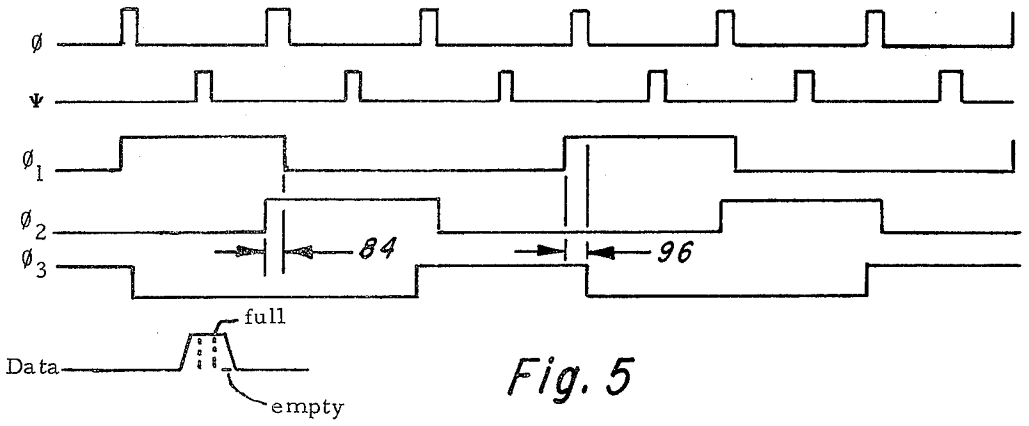
FIG. 5 is a graph illustrating the various clock pulses suitable for operation of the circuit shown in FIG. 4.

With reference now to FIG. 4, there is schematically illustrated a three phase multiplexed charge coupled device input with dynamic ratioless input logic. The input unit comprises a single inverter which includes insulated gate field-effect transistors 76 and 78. Input data is applied to the input terminal 80 and is gated by the gating transistor 82. A two phase non-overlapping clock system is used to control the input circuitry shown in FIG. 4. The two clocks, $\Phi$ and $\psi$ are shown in FIG. 5. One of the clock phases, such as $\Phi$, is used to generate the three phase overlapping clocks required for operating the CCD; thus these three clock phases $\Phi_1$, $\Phi_2$, and $\Phi_3$ operate at one third the frequency of the $\Phi$ clock. Furthermore, the three phase clock generator operates in such a manner that the duration of the $\Phi$ clock determines the amount of overlap in the three phases. This is seen in FIG. 5, for example, at 84. The other clock phase $\psi$ is used to gate the input data to the inverter output 86.

Operation of the input circuit for the charge transfer device memory in accordance with the invention will be explained with reference to FIGS. 4 and 5. In FIG. 4, the semi-circular areas 88A, 88B and 88C respectively depict the pn junction input diodes of the charge transfer device shift registers A, B and C. Phase 3 transfer electrodes are diagrammatically depicted at 90; Phase 1 transfer electrodes are shown at 92; while phase 2 transfer electrodes are shown generally at 94. As those familiar with operation of charge coupled device shift registers will understand, potential wells are formed under transfer electrodes, such as phase 3 electrodes 90, whenever a potential is applied to those electrodes. Charge in the form of minority carriers can be stored in these potential wells and can be transferred to an adjacent potential well, such as will be formed under phase 1 electrodes 92 responsive to a voltage applied thereto. Charge can be transferred from under one electrode such as 90 to the adjacent electrode such as 92 only during the interval when the phase 3 and phase 1 clock pulses overlap. This overlap can be seen, for example, in FIG. 5 at 96.

In operation, when the clock phase $\psi$ is turned on, the node 86 will assume a logic level that is the inverse of the logic level applied at the input terminal 80 of the dynamic ratioless inverter input circuit. For example, if the input data at node 80 is below the threshold voltage of transistor 78, this transistor will remain off. The input data is transferred to the gate of transistor 78 responsive to the clock voltage $\psi$ biasing on transistor 82. Thus, if the input data is "low", the node 86 will charge to a potential of $E-V_t-V$ where E is the amplitude of $\psi$ the V term is the small decrease due to capacity coupling between the $\psi$ clock and node 86 and $V_t$ is the threshold voltage of transistor 76. When the node voltage at 86 is "high", this will result in an empty potential well in the associate charge coupled device shift register. By making the capacitance C relatively large, a small amount of charge is allowed to enter the potential wells that are empty. This small amount of charge, often referred to as a "fat zero" is useful in compensating for fast surface state dispersion.

When the input data is high, node 86 is discharged by transistor 78 when $\psi$ turns off. This will result in a full potential well at the first bit of the associated CCD shift register.

Since the charge coupled devices are timed from the $\Phi$ clock, data can only be entered into a CCD when clock phases overlap during the on time for the $\Phi$ clock. By staggering the inputs of the three parallel CCDs, as shown in FIG. 4, data can sequentially be entered into the three shift registers A, B and C during each clock overlap. The input charge-voltage relationship of this configuration is that a low data input at node 80 results in an empty well in a corresponding shift register whereas a high input voltage at node 80 results in a full potential well. The input data applied at terminal 80 is controlled such that it overlaps the $\psi$ clock as shown in FIG. 5.

Figure 6:
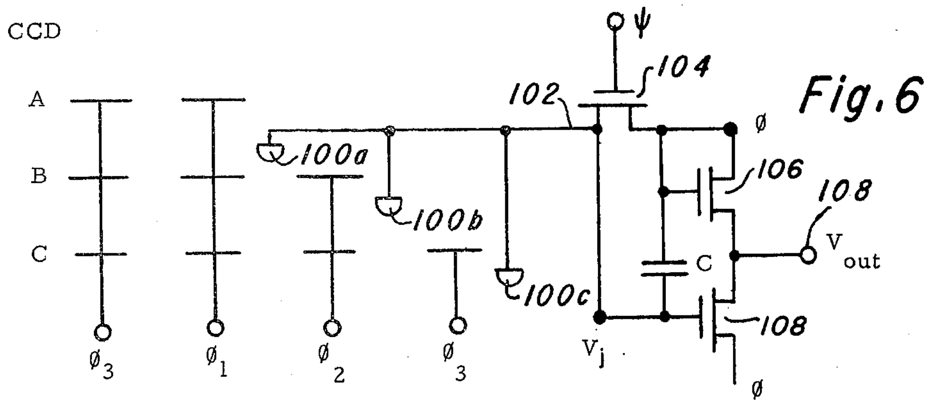
FIG. 6 is a schematic and diagrammatic illustration of a suitable output circuit for demultiplexing the signals on three multiplexed CCD shift registers and providing an output voltage corresponding to the logic level for the detected digital signal.
Figure 7:
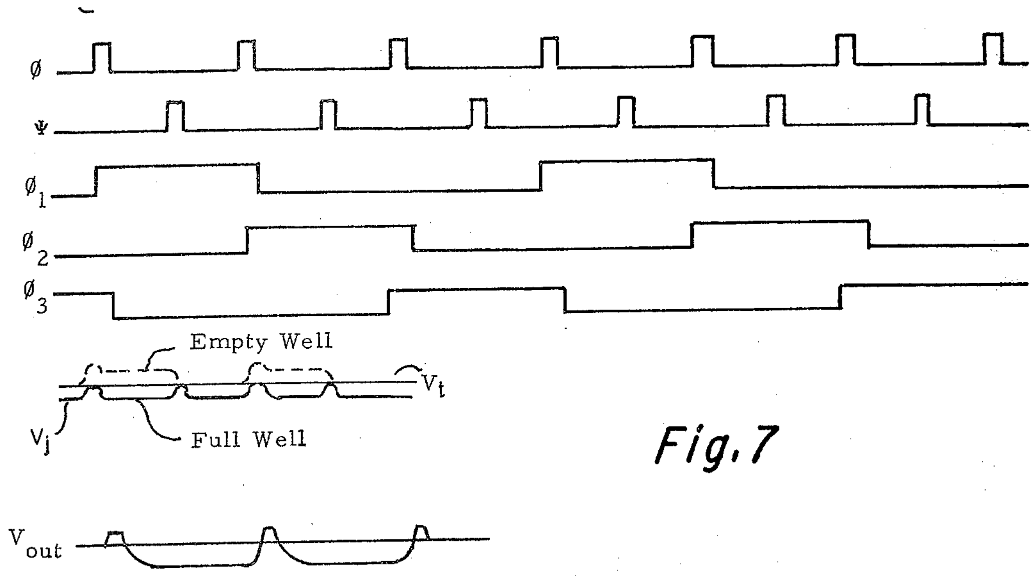
FIG. 7 is a graph illustrating the wave forms of various signals present in operation of the circuit illustrated in FIG. 6.

With reference now to FIGS. 6 and 7, there is illustrated schematically and diagrammatically, an output detector utilizing dynamic ratioless IGFET output logic. As with the input circuit described in FIG. 4, a two-phase non-overlapping $\Phi$ and $\psi$ clock is required along with a three-phase CCD clock system. The various clocks are illustrated in FIG. 7. The output of the multiplexed parallel shift registers A, B and C are terminated on three different phases and the output diodes 100A, 100B and 100C are commonly connected to the source 102 of a single precharge transistor 104. The gate of transistor 104 is connected to the clock phase $\psi$ and the drain of transistor 104 is connected to the clock phase $\Phi$. Utilizing this detector configuration, a separate output transfer gate is not required. More importantly the detector, which comprises transistors 104, 106 and 108, can be fabricated on the chip in the same width as the three parallel shift registers A, B and C. Also, the output at terminal 108 is a voltage corresponding to the logic level of the binary data detected. Thus, the logic voltage is regenerated on the chip by the detector.

In operation, the node $V_j$, which is connected to the output diodes 100A, 100B and 100C, is precharged to zero during the period when clock $\psi$ is turned on. The $\Phi$ clock line connected to the drain of transistor 104 is used as the voltage ground during the interval that the $\psi$ clock is turned on. Thus, when the $\Phi$ clock turns on, the output voltage at 108 rises to a potential of $E-V_t$, where E is the amplitude of $\Phi$ and charge can transfer to one of the CCD registers from the precharged diodes 100A, 100B or 100C if the corresponding potential well is empty. By way of illustration, if clock $\Phi_3$ is on and then clock $\Phi_1$ turns on, a channel is created between the output diode 100A, and the last $\Phi_3$ gate in register A. If that potential well is empty, charge will flow from the output diode 100A, which previously was placed at ground by the precharge operation. The voltage $V_j$ will then rise until it equals the falling surface potential in that potential well. If the potential well is full, however, only a small amount of charge will flow from the diode 100A to fill the channel. An empty potential well will cause the potential $V_j$ to rise above the threshold voltage of transistor 108 and a full well will not allow the voltage $V_j$ to go above threshold.

More specifically, the output 108 is charged to the potential of $E-V_t$ during the interval that the clock $\Phi$ is on and the CCD clocks are overlapping. It will be noted with reference to FIG. 7, that "overlap occurs between clocks $\Phi_1$, $\Phi_3$; $\Phi_1$; $\Phi_2$; and $\Phi_2$, $\Phi_3$ during respective intervals". that the clock Φ is on. When Φ turns off, the terminal 108 is discharged to ground through transistor 108 if an empty potential well pulled the potential $V_j$ above the threshold of transistor 108. The output voltage, however, will remain high if a full well was at the output of the CCD register.

Figure 8:
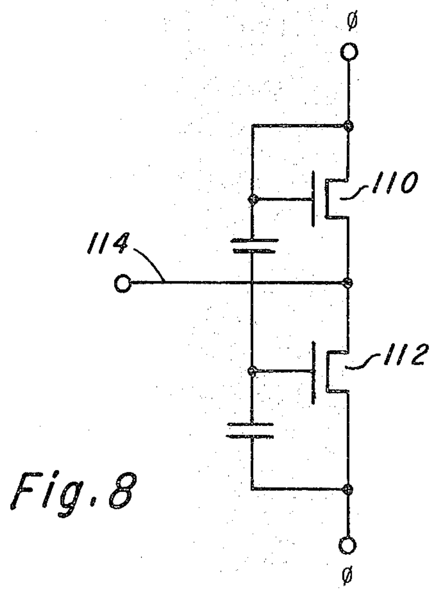
FIG. 8 is a schematic illustrating a suitable circuit that can be used in conjunction with the circuit shown in FIG. 6 for increasing the sensitivity of the detector or for use with high threshold voltage insulated gate field-effect transistor devices.

In some situations, such as in a high $V_t$ process, the diode voltage can be precharged to the threshold voltage by a special $V_t$ generator. Such a generator, for example, is shown in FIG. 8, and includes transistors 110 and 112. The output 114 of this circuit is connected to the drain of the transistor 104 shown in FIG. 6. The circuit illustrated in FIG. 8 is effective to place the precharge voltage close to the threshold voltage of the transistors allowing more sensitivity in the charge detector circuit. Such a generator should have large coupling between the Φ clock line and the $V_t$ node to insure that the voltage drops below threshold when Φ turns off.

Figure 10:
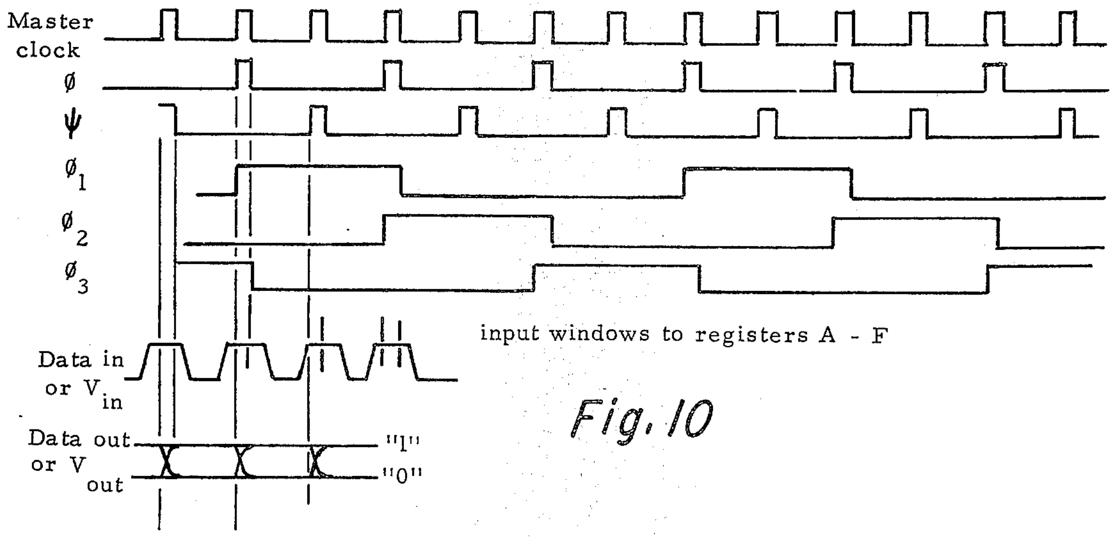
FIG. 10 illustrates various wave forms and clocks suitable for operation of the circuits shown in FIG. 9.
Figure 11:
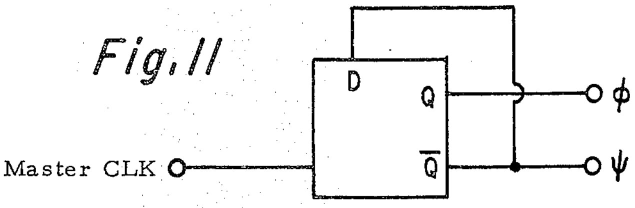
FIG. 11 schematically illustrates a D-type flip-flop for generating the two phase non-overlapping clock signals required for operating the insulated gate field-effect transistor input and output circuitry from a system master clock.

In some applications it may be desirable to provide charge transfer device memory configuration having an overall data rate that is twice that of either the Φ or ψ clock rates. This can be achieved in a three phase charge coupled device shift register configuration by multiplexing two sets of multiplexed shift register units having 3 parallel charge coupled device shift registers each. Such a configuration is illustrated, for example, in FIG. 9 and a suitable clocking system for this configuration is shown in FIG. 10. In this technique, a single master clock is used to generate the non-overlapping Φ and ψ clocks. This may conveniently be effected, for example, by utilizing a D-type flip-flop such as illustrated in FIG. 11.

Figure 9:
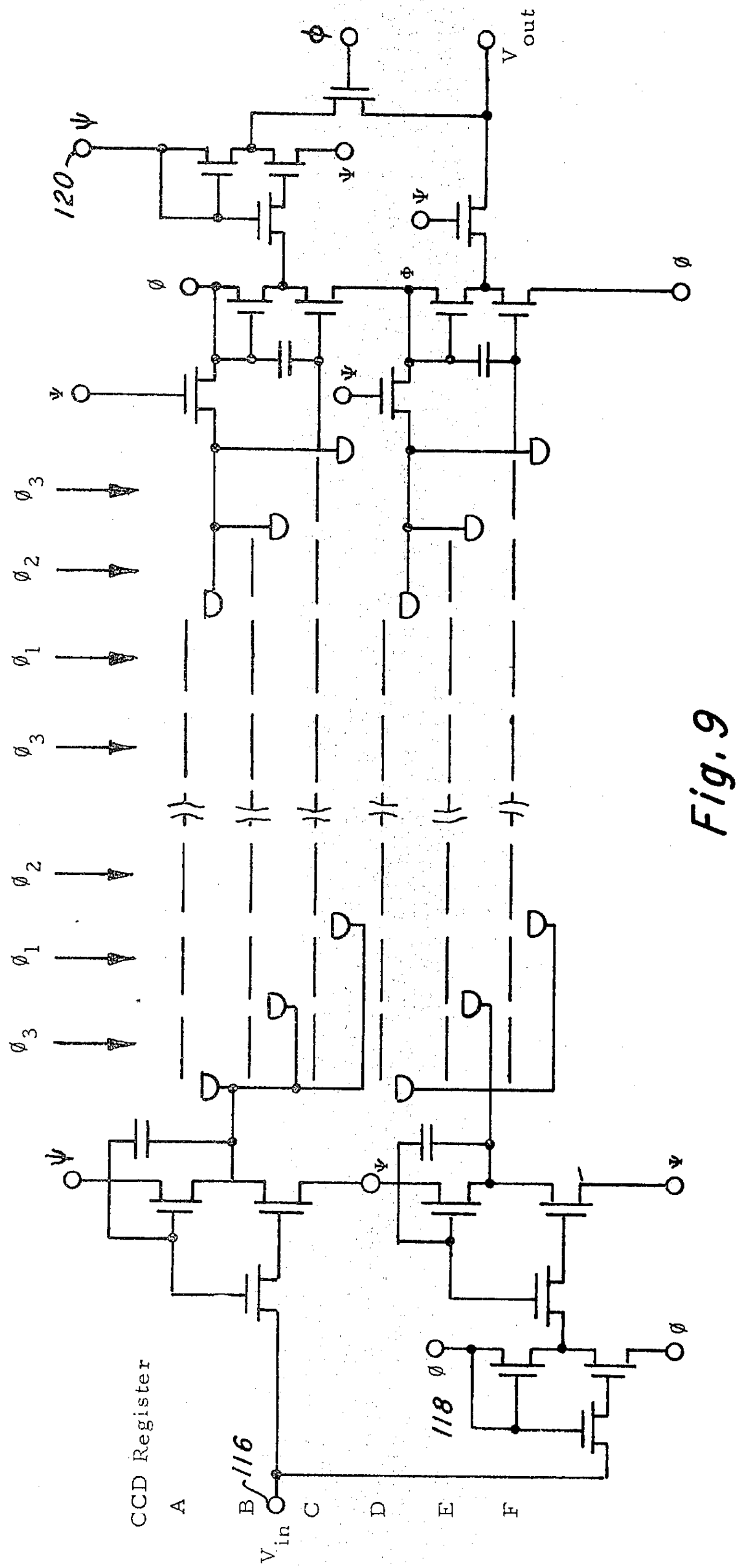
FIG. 9 is a schematic illustration showing circuitry suitable for multiplexing two adjacent sets of three each multiplexed CCD shift registers and detecting the output signals and demultiplexing the signals so as to provide an effective data rate equal to a master synchronization clock used to control the system with which the charge transfer device memory is to be utilized.

In FIG. 9, two sets of multiplexed CCD shift register units are in turn multiplexed to provide a data rate equal to the master clock. The first set of shift registers includes shift registers A, B and C while the second set of shift registers includes shift registers D, E and F. Operation at each set of three multiplexed shift registers is similar to that previously described. In FIG. 9, input data at terminal 116 is accepted into one of the CCD shift registers A – F during each excursion of the master clock pulse.

A dynamic inverter, shown generally at 118, is used in conjunction with shift registers D, E and F to delay alternating bits of data by one master clock period. Then one CCD shift register from the set of shift registers A, B and C and one shift register in the set of shift registers D, E and F is filled simultaneously with application of the ψ clock. An additional dynamic inverter, shown generally at 120, is included at the output of the A, B and C registers to put the data back into the proper order and to invert all of it to the proper polarity.

The combination of the dynamic CCD shift registers with the dynamic ratioless input/output circuitry advantageously combine the best features of both technologies. As previously noted, the Φ and ψ clocks can be externally generated from the chip or can be generated on the chip with a D-type flip-flop from a master clock. The multiphase CCD clock can be generated on the chip in accordance with conventional technology. The existing two phase dynamic input/out circuits inferface with standard metal insulator semiconductor circuitry and with the special requirements and level and timing of the CCD registers. Thus, it can be seen that the present invention provides a charge transfer device memory configuration that is compatible with existing metal insulator semiconductor circuitry. In addition, the layout and design of the chip is simplified in that no clock must operate faster than the data rate.

While the present invention has been described in detail with respect to illustrative embodiments, it will be apparent to those skilled in the art that various changes may be made without departing in the spirit or scope of the present invention. Such changes include variations in input and output circuitry to improve reliability and sensitivity.

What is claimed is:

1. A charge transfer device digital data processing system comprising in combination on a semiconductor chip:

charge transfer device shift register means having an input diode for entering data therein and an output diode charge sink;

first clock pulse operable insulated gate field-effect transistor ratioless inverter circuit means selectively connected to said input diode for operating said input diode to enter charge into said shift register responsive to voltages corresponding to digital logic input signal levels;

second clock pulse operable insulated gate field-effect transistor ratioless inverter circuit means connected to said output diode, said second inverter circuit means including a first insulated gate field-effect transistor means for precharging said output diode to a reference potential, said output diode responsive to absence of charge corresponding to a logic 0 in the last bit of said shift register to discharge to a second voltage level, said output diode further responsive to presence of charge corresponding to a logic 1 in the last bit of the shift register to remain charged substantially at said reference voltage, said second inverter circuit means adapted to respond to said discharged and charged conditions of said output diode to produce respectively a logic 0 or a logic 1 output signal level.

2. A charge transfer device digital data processing system according to claim 1, further including insulated gate field-effect transistor switch means for selectively connecting output signals produced by said second inverter means to said first ratioless inverter circuit means for recirculation of data through said shift register means.

3. A charge transfer device digital data processing system as set forth in claim 1, wherein said detector means further includes second insulated gate field-effect transistor means for selectively coupling the detector output to circuit ground, said second transistor means including a first transistor for precharging the output of said detector to a reference potential and a second transistor having a gate electrode connected to said output diode, a first terminal connected to circuit ground and a second terminal connected to the output of said detector whereby responsive to said diode remaining charged to said reference potential said second transistor is biased off whereas responsive to said diode being discharged to said second potential, said second transistor is biased on, thereby connecting said precharged output to circuit ground.

4. In a data processing system including metal insulator semiconductor logic circuitry operably responsive to first and second non-overlapping clocks respectively having a preselected frequency, a dynamic semiconductor charge transfer device memory compatible with said metal-insulator-semiconductor logic circuitry and having an effective data rate equal to said preselected frequency, comprising in combination on a chip:

a first set of n-parallel semiconductor charge transfer device shift registers on said chip, each shift register having an input and output diode associated therewith, said shift registers operably responsive to an n-phase overlapping clock system, said shift registers being disposed on said chip such that the input diode of each shift register is spaced from the input diode of the adjacent shift register in the direction of charge propagation along said shift registers by a distance corresponding to one phase of said n-phase clock;

insulated gate field-effect transistor input means connected to said input diodes of said *n* shift registers and responsive to said first clock and respective overlapping portions of said n-phase clock system to enter binary input data into said shift registers during respective phases of said n-phase clock system; and insulated gate field-effect transistor charge detector means on said chip adjacent said *n* shift registers, said detector means effective to precharge said output diodes to a reference value during said second clock, whereby the voltage levels of said output diodes are respectively changed during the subsequent individual phases of the n-phase clock system by an amount corresponding to the binary data detected, said detector means operably responsive to the respective voltage levels of said output diodes, to produce output voltage levels corresponding to the binary logic levels of the detected charges in a sequence corresponding to the sequence of said binary input data.

5. In a data processing system including metal-insulator-semiconductor logic circuitry operably responsive to first and second non-overlapping clocks respectively having a preselected frequency, a dynamic charge transfer device memory compatible with said logic circuitry and having an effective data rate equal to said preselected frequency comprising in combination on a chip:

input terminals for receiving said first and second non-overlapping clocks;

clock generator means on said chip for receiving said first clock and generating, responsive thereto, an n phase overlapping clock system, each phase thereof having a frequency of $1/n$ that of said first clock, wherein *n* is an integer;

a first set of *n* parallel charge transfer device shift registers on said chip, each shift register having an input and output diode associated therewith, said shift registers being disposed on said chip such that the input diode of each shift register is laterally spaced from the input diode of the adjacent shift register in the direction of data propogation by a distance corresponding to one phase of said *n* phase clock;

insulated gate field-effect transistor input means connected to said *n* shift registers for multiplexing binary input data thereon responsive to said second clock and an overlapping portion of said n phase clock system;

insulated gate field-effect transistor charge detector means on said chip adjacent said n shift registers, said detector means effective to precharge said output diodes to a reference value during said second clock, whereby the voltage level of said output diodes is changed during the subsequent first phase clock by an amount corresponding to the binary data detected, said detector means operable to produce, responsive to the voltage level of said output diodes, and output voltage corresponding to the logic level of the detected charge; and means for connecting the output of said detector means to said input means for recirculating data.

6. A dynamic charge transfer device memory as set forth in claim 5 wherein said input means comprise first and second series connected insulated gate field-effect transistors, the common terminal of said first and second transistors being connected to all of said input diodes of said *n* shift registers, and a third insulated gate field-effect transistor having a source for receiving input data, a drain connected to the gate of said second transistor, and a gate electrode connected to said second clock, whereby responsive to said second clock the complement of the data present at the source of said third transistor is produced at the juncture of said first and second transistors such that charge corresponding to successive input bits is sequentially entered into successive ones of said *n* shift registers during the successive overlap portions of said overlapping *n* phase clock system, thereby producing an effective data rate equal to the data rate of said first clock.

7. A dynamic charge transfer device memory as set forth in claim 6 including a second set of n parallel shift registers with associated insulated gate field-effect transistor input means and insulated gate field-effect transistor detector means; means for connecting the output of said first set of *n* charge transfer device shift registers to the input of said second set of *n* parallel shift registers; and means for connecting the output of said second set of *n* shift registers to the input of said first set of *n* shift registers.

8. A dynamic charge transfer device memory as set forth in claim 7 wherein said connecting means comprises a doped interconnect region in the surface of said chip between said first and second sets of shift registers, said interconnect having a width on the order of the width of one charge transfer device shift register.

9. In a digital data metal insulator semiconductor processing system operable in responsive to a master synchronization clock of a preselected frequency, a charge transfer device memory configuration having a data rate equal to said master synchronization clock and operably responsive thereto, comprising in combination on a single semiconductor chip;

first clock generating means for receiving said master clock and generating, responsive thereto, first and second non-overlapping clocks respectively having a frequency of one-half that of said master clock;

second clock generating means for receiving said first clock and generating, responsive thereto, an *n*-phase overlapping clock system suitable for controlling charge transfer device shift registers, each phase thereof having a frequency of $1/2n$ the frequency of said master clock, wherein *n* is an integer; and a plurality of parallel charge transfer device shift register units on said chip, each shift register unit having first and second sets of parallel shift registers of n shift registers each, each shift register unit having ratioless dynamic input means on said chip for multiplexing input data onto said first and second sets of shift registers, and output ratioless dynamic detector means on said chip for sequentially detecting the charge at the output of each shift register of said first and second sets of said shift register unit and demultiplexing said data to provide a voltage corresponding to the binary logic level of detected charge, whereby the effective clock rate of said shift register unit is the same as the clock rate of said master clock.

10. A charge transfer device memory configuration as set forth in claim 9, wherein said first clock generator means comprises a D-type flip-flop.

11. A charge transfer device memory configuration as set forth in claim 10, wherein said input means comprises first and second dynamic ratioless inverters coupled respectively to said first and second sets of shift registers, each of said inverters having an output connecting in common all of the input diodes of the parallel shift registers associated therewith, and having a gating transistor responsive to said second clock connecting each of said first and second inverters to an input terminal, said first and second inverters effective to gate input data to one of the shift registers associated therewith responsive to said second clock, said second inverter coupled to said input terminal by a third inverter responsive to said first clock whereby alternate bits of input data are delayed by one clock time before they are transferred to said second inverter.

12. A charge transfer device memory configuration as set forth in claim 11, wherein said output detector includes first and second means for precharging the output diodes of each shift register of said first and second sets to a reference potential, whereby the voltage potential at said diodes varies responsive to the amount of charge subsequently shifted to the output bit of the corresponding charge transfer device shift register; and transistor means responsive to the voltage potential at said output diodes and said first clock, said transistor means coupled to an output terminal and effective to control the output voltage thereat to either a logic 1 or a logic 0 level, depending on the voltage potential at the output diode of the charge transfer device being detected, said first precharge means coupled to said output by a delay stage responsive to said second clock, thereby producing an output having a data rate equal to said master clock.

13. A charge transfer device memory configuration as set forth in claim 12, wherein said first and second precharge means respectively include a single insulated gate field-effect transistor, the source of which is connected to each output diode of the charge transfer device shift registers associated therewith, the gate of which is disposed for receiving said second clock, and the drain of which is connected to said first clock, effectively coupling said drain to circuit ground during the interval said second clock is on.

14. A charge transfer device memory configuration as set forth in claim 13, wherein said transistor means comprises a first insulated gate field-effect transistor having its source and gate connected to said first clock and having its drain connected to an output terminal, and a second insulated gate field-effect transistor having one terminal connected to said output terminal, the other terminal of which is connected to said first clock, the gate of which is connected to each of said output diodes associated therewith, whereby during said first clock the voltage potential at the output diode of the charge transfer device shift register being detected controls conduction of said second insulated gate field-effect transistor whereby said output terminal is either shorted to circuit ground at the termination of said first clock or remains at a potential that is near the amplitude of said first clock.

15. A charge transfer device memory configuration as set forth in claim 14 further including means for connecting the voltage at said output terminal of said detector back to said input means thereby enable recirculation of data.

16. A charge transfer device memory configuration as set forth in claim 15, wherein said connecting means comprises a doped interconnect region in the surface of said chip adjacent to said shift register unit of parallel charge transfer device shift registers.

17. A charge transfer device memory configuration as set forth in claim 16 further including means for selectively connecting the output from the detector of said first shift register unit to the input of an adjacent shift register unit thereby enabling organizing the charge transfer device memory into a variety of configurations.

18. A charge transfer device memory configuration as set forth in claim 17 including means on said chip for selectively addressing a shift register unit from said plurality of units, and enabling entry of new data into said shift register and to said selected shift register unit or reading data stored therein.

* * * * *